United States Patent
Green et al.

(10) Patent No.: US 11,391,564 B2
(45) Date of Patent: Jul. 19, 2022

(54) ACTIVE ALIGNMENT TECHNIQUE FOR MEASURING TILT ERRORS IN ASPHERIC SURFACES DURING OPTICAL ASSEMBLY USING LENS ALIGNMENT STATION (LAS)

(71) Applicant: Opto-Alignment Technology, Inc., Indian Trail, NC (US)

(72) Inventors: Mark E. Green, Concord, NC (US); Rognvald P. Garden, Charlotte, NC (US)

(73) Assignee: Opto-Alignment Technology, Inc., Indian Trail, NC (US)

( * ) Notice: Subject to any disclaimer, the term of this patent is extended or adjusted under 35 U.S.C. 154(b) by 130 days.

(21) Appl. No.: 17/012,784

(22) Filed: Sep. 4, 2020

(65) Prior Publication Data
US 2021/0095955 A1 Apr. 1, 2021

Related U.S. Application Data
(60) Provisional application No. 62/907,893, filed on Sep. 30, 2019.

(51) Int. Cl.
*G01B 11/25* (2006.01)
*G01B 11/24* (2006.01)

(52) U.S. Cl.
CPC ........ *G01B 11/254* (2013.01); *G01B 11/2441* (2013.01)

(58) Field of Classification Search
CPC ............ G01B 9/02072; G01B 9/02085; G01B 9/02091; G01B 11/2441; G01B 11/2522;
(Continued)

(56) References Cited

U.S. PATENT DOCUMENTS 5,448,355 A * 9/1995 Noguchi ............... G01M 11/02
250/237 G
6,750,958 B1 * 6/2004 Fantone ................ G01B 11/24
356/124
(Continued)

FOREIGN PATENT DOCUMENTS

CN 102686972 A * 9/2012 ......... G01B 11/2441
CN 107850555 A * 3/2018 ......... G01B 11/2441
(Continued)

OTHER PUBLICATIONS

Filhaber, et. al., "How Wedge and Decenter Affect Aspheric Optics", Photonics Spectra, Oct. 1, 2013, pp. 44-47, Laurin Publishing.
(Continued)

*Primary Examiner* — Michael P Stafira
(74) *Attorney, Agent, or Firm* — Coats + Bennett, PLLC

(57) ABSTRACT

An optical alignment system and corresponding method measures tilt errors of one or more optical surfaces, including aspheric surfaces, using interference patterns created by an illumination of the edges of an optical surface. An exemplary optical alignment system comprises a test mount centered on (and configured to rotate about) an axis, a laser, a detector and a processing circuit. The laser directs laser light along the axis to illuminate a test surface of an optical assembly disposed in the test mount. The detector detects a tilt orbit of an interference pattern produced in a first image plane perpendicular to the axis when the test mount rotates about the axis. The first image plane is spaced from a second image plane (e.g., paraxial ray focus plane) by a difference $\Delta h$. The processing circuit determines a tilt error $\theta$ of the test surface from the detected tilt orbit and the difference $\Delta h$.

22 Claims, 11 Drawing Sheets

(58) Field of Classification Search
CPC ............ G01B 2210/52; G01B 9/02004; G01B 9/0203; G01B 9/04; G01B 2290/70; G01B 9/02018; G01B 11/00; G01B 9/02019; G01B 9/02032; G01B 9/02043; G01B 9/02044; G01B 9/02057; G01B 9/02077; G01B 9/02097; G01B 11/303; G01B 2290/65; G01B 9/02021; G01B 9/02027; G01B 9/02076; G01B 9/0209; G01B 11/002; G01B 11/162; G01B 11/24; G01B 9/02068; G01B 9/02207; G01B 9/02041; G01B 2290/15; G01B 2290/35; G01B 2290/55; G01B 9/02001; G01B 9/0201; G01B 9/02028; G01B 9/02059; G01B 9/02061; G01B 9/02098; G01B 11/024; G01B 11/16; G01B 21/042; G01B 2290/45; G01B 9/02005; G01B 9/02011; G01B 9/02014; G01B 9/02024; G01B 9/02045; G01B 9/0205; G01B 9/02078; G01B 9/02084; G01B 9/02094
See application file for complete search history.

(56) References Cited

U.S. PATENT DOCUMENTS 7,405,833 B2 * 7/2008 Smythe ................ G01M 11/005
356/514

2005/0206908 A1 * 9/2005 Hamed ................ G01B 11/272
356/508
2015/0355441 A1 * 12/2015 Kim .................... G02B 17/0808
359/729

FOREIGN PATENT DOCUMENTS

| CN | 108981593 A * | 12/2018 | ............ G01B 11/06 |
| DE | 102012023377 B3 * | 5/2014 | ............ G01B 11/00 |
| EP | 2549227 A1 * | 1/2013 | .......... G01B 11/272 |
| JP | H07167739 A * | 7/1995 | |
| JP | 2001165613 A * | 6/2001 | ........ G01B 11/2441 |
| JP | 3410896 B2 * | 5/2003 | |
| JP | 2004532990 A * | 10/2004 | |
| JP | 2006343234 A * | 12/2006 | |
| JP | 2008089356 A * | 4/2008 | |
| JP | 2019521352 A * | 7/2019 | |
| KR | 101181202 B1 * | 9/2012 | |
| WO | WO-9966308 A1 * | 12/1999 | ............ G01B 11/00 |

OTHER PUBLICATIONS

Hahne et al., "Automated asphere centration testing with AspheroCheck UP", Proceedings of Society of Photo-Optical Instrumentation Engineers, vol. 10448, Oct. 16, 2017, pp. 1-8, Rochester, NY.
Turner et al., "Active Alignment Techniques Improve Lens Centering", Photonics Spectra, Dec. 1, 2014, pp. 42-44, Photonics Media.
Trioptics, "Optical Centration Measurement and Lens Alignment", pp. 1-7, obtained on Aug. 21, 2019, obtained from Internet: https://www.trioptics.com/knowledge-base/optical-centration-measurement-and-lens-alignment/.

* cited by examiner

LASER FOCUS IMAGE VS. RETICLE IMAGE

B. LAS VS. AUTOCOLLIMATOR FOCUS SENSITIVITIES the detector and is configured to determine a tilt error θ of the test surface from the detected tilt orbit and the difference Δh.

According to a further embodiment, the detector is further configured to detect a centration orbit of a reflection of the test surface produced in the second image plane when the test mount rotates about the axis, and the processing circuit is further configured to determine a centration error of the test surface from the detected centration orbit.

According to a further embodiment, the second image plane comprises a cats-eye image plane or a confocal image plane.

According to a further embodiment, the detector is further configured to detect the tilt orbit of the interference pattern produced in each of a plurality of first image planes when the test mount rotates about the axis, where each of the plurality of first image planes are perpendicular to the axis and spaced from the second image plane by a different difference Δh; and the processing circuit determines the tilt error of the test surface from the plurality of detected tilt orbits and the corresponding differences Δh.

According to a further embodiment, the tilt orbit has a radius P representing a distance from the axis to a center of the interference pattern defining the tilt orbit, and the processing circuit is configured to determine the tilt error of the test surface from the radius P and the difference Δh. According to a further embodiment, the tilt error θ is proportional to the radius P and inversely proportional to the difference Δh, i.e., $\theta \propto (P/\Delta h)$.

According to a further embodiment, the optical assembly comprises a plurality of test surfaces associated with one or more lenses comprised in the optical assembly, the detector is configured to detect a tilt orbit of each interference pattern produced in a corresponding first image plane as the test mount rotates about the axis, where each interference pattern is produced by interference resulting from the illumination of edges of the corresponding test surface, and the processing circuit is configured to determine the tilt error of each test surface from the corresponding detected tilt orbit and the difference Δh. According to a further embodiment, each detected tilt orbit is detected in a different first image plane associated with a corresponding different second image plane. According to a further embodiment, each first image plane has a different difference Δh relative to the corresponding second image plane.

According to a further embodiment, the test surface comprises a surface of an aspheric element.

One exemplary embodiment comprises a method of measuring lens alignment errors. The method comprises illuminating edges of a test surface of an optical assembly disposed in a test mount with laser light emitted along an axis to produce an interference pattern in a first image plane perpendicular to the axis. The test mount is centered on the axis, where the first image plane is spaced from a second image plane by a difference Δh, and the second image plane represents a focus plane for paraxial rays of the laser light reflected by the test surface. The method further comprises detecting a tilt orbit of the interference pattern produced in the first image plane when the test mount rotates about the axis, and determining a tilt error of the test surface from the detected tilt orbit and the difference Δh.

According to a further embodiment, the method further comprises illuminating the test surface with the laser light to produce a reflection of the test surface in the second image plane, detecting a centration orbit of the reflection produced in the second image plane when the test mount rotates about

ACTIVE ALIGNMENT TECHNIQUE FOR MEASURING TILT ERRORS IN ASPHERIC SURFACES DURING OPTICAL ASSEMBLY USING LENS ALIGNMENT STATION (LAS)

RELATED APPLICATION

This application claims priority to U.S. Application No. 62/907,893, filed 30 Sep. 2019, disclosure of which is incorporated in its entirety by reference herein.

BACKGROUND

Aspheric elements reduce aberration, permit greater throughput while improving imaging, and reduce the number of optical elements in a given design. As such, aspheric elements are becoming increasingly important to the design of optical systems, particularly as the demand for high-resolution and high-quality imaging increases. As with other optical elements, it is important to align aspheric elements within an optical assembly. Traditional lens alignment systems, however, assume all optics in the assembly are spherical, and thus experience challenges with respect to the accurately alignment of aspherical surfaces.

This challenge is most clearly seen with conventional alignment techniques, which in assemblies where high-precision is priority, generally provide the most-cost effective solution for guiding lens positioning during the assembly process. However, because conventional active alignment tools are designed for paraxial measurements, such active alignment techniques only reduce the centration error of the paraxial center of curvature in the case of aspheric surfaces. Indeed, conventional active alignment techniques are blind to aspheric edges, and consequently cannot account for tilt errors of the aspheric axis with sufficient accuracy. This shortcoming often leads to centered, yet tilted, aspheric surfaces, which degrades the final waveform of the optical assemblies incorporating aspheric elements. Thus, there remains a need for improved alignment techniques, and particularly for improved active alignment techniques for aspheric elements.

SUMMARY

The solution presented herein presents an optical alignment system and method that measures tilt errors of one or more optical surfaces, including aspheric surfaces. Generally, the solution presented herein relies on interference patterns, created by illumination of the edges of an optical surface, to detect any tilt error of the optical surface.

One exemplary embodiment comprises an optical alignment system configured to measure alignment errors of one or more optical surfaces. The optical alignment system comprises a test mount, a laser, a detector and a processing circuit. The test mount is centered on an axis and is configured to rotate about the axis. The laser is configured to direct laser light along the axis to illuminate a test surface of an optical assembly disposed in the test mount. The detector is configured to detect a tilt orbit of an interference pattern produced in a first image plane perpendicular to the axis when the test mount rotates about the axis. The interference pattern is produced by interference resulting from the illumination of edges of the test surface by the laser light. The first image plane is spaced from a second image plane by a difference Δh, and the second image plane represents a focus plane for paraxial rays of the laser light reflected by the test surface. The processing circuit is operatively connected to the axis, and determining a centration error of the test surface from the detected centration orbit.

According to a further embodiment, the second image plane comprises a cats-eye image plane or a confocal image plane.

According to a further embodiment, detecting the tilt orbit of the interference pattern comprises detecting the tilt orbit of the interference pattern produced in each of the plurality of the first image planes when the test mount rotates about the axis, each of the plurality of first image planes being perpendicular to the axis and being spaced from the second image plane by a different difference Δh, and determining the tilt error comprises determining the tilt error of the test surface from the plurality of detected tilt orbits and the corresponding differences Δh.

According to a further embodiment, the tilt orbit has a radius P representing a distance from the axis to a center of the interference pattern defining the tilt orbit, and determining the tilt error comprises determining the tilt error of the test surface from the radius P and the difference Δh. According to a further embodiment, the tilt error θ is proportional to the radius P and inversely proportional to the difference Δh, i.e., θ∝(P/Δh).

According to a further embodiment, the optical assembly comprises a plurality of test surfaces associated with one or more lenses, detecting the tilt orbit comprises detecting a tilt orbit of each interference pattern produced in a corresponding first image plane as the test mount rotates about the axis, where each interference pattern is produced by interference resulting from the illumination of edges of the corresponding test surface, and determining the tilt error comprises determining a tilt error of each test surface from the corresponding detected tilt orbit and the difference Δh. According to a further embodiment, detecting each tilt orbit comprises detecting each tilt orbit in a different first image plane associated with a corresponding second image plane. According to a further embodiment, each first image plane has a different difference Δh relative to the corresponding second image plane.

According to a further embodiment, the test surface comprises a surface of an aspheric element.

DETAILED DESCRIPTION

Conventional active alignment techniques were designed for spherical elements, and do not have the capability to effectively address tilt errors for non-spherical surfaces, i.e., those found with aspheric elements. One technique for addressing this issue uses an external module added to the traditional active alignment tool. The external module uses a non-contact distance measurement probe positioned with precision stages to directly measure the aspheric edges, and hence the tilt errors, of the aspheric surface. While the quality of probes and stages used by such external modules provide accurate measurement of aspheric tilt, the additional module increases the cost of the active alignment tool. Moreover, because the direct distance measurement of the aspheric edges assumes the inspection of the lens top surface, its use during optical assembly, where the aspheric surface may be out of reach of the probe, is limited.

The solution presented herein provides a simpler, lower-cost solution for aspheric tilt measurements that may be used with active alignment techniques and systems, e.g., the Lens Alignment Station (LAS) produced by Opto-Alignment Technology, Inc. More particularly, the solution presented herein uses interference patterns resulting from return reflection of laser light from a surface edge to determine tilt errors relative to an axis of an optical surface. While the solution presented herein was developed for determining tilt errors of aspheric optical surfaces, it will be appreciated that the principles and techniques presented herein may be used to determine tilt errors of any optical surface. Further, while the solution presented herein is described in terms of detecting the tilt error of a single optical surface, it will be appreciated that the solution presented herein may be used to evaluate each optical surface of an optical assembly comprising a single optical element or multiple optical elements.

Figure 1:
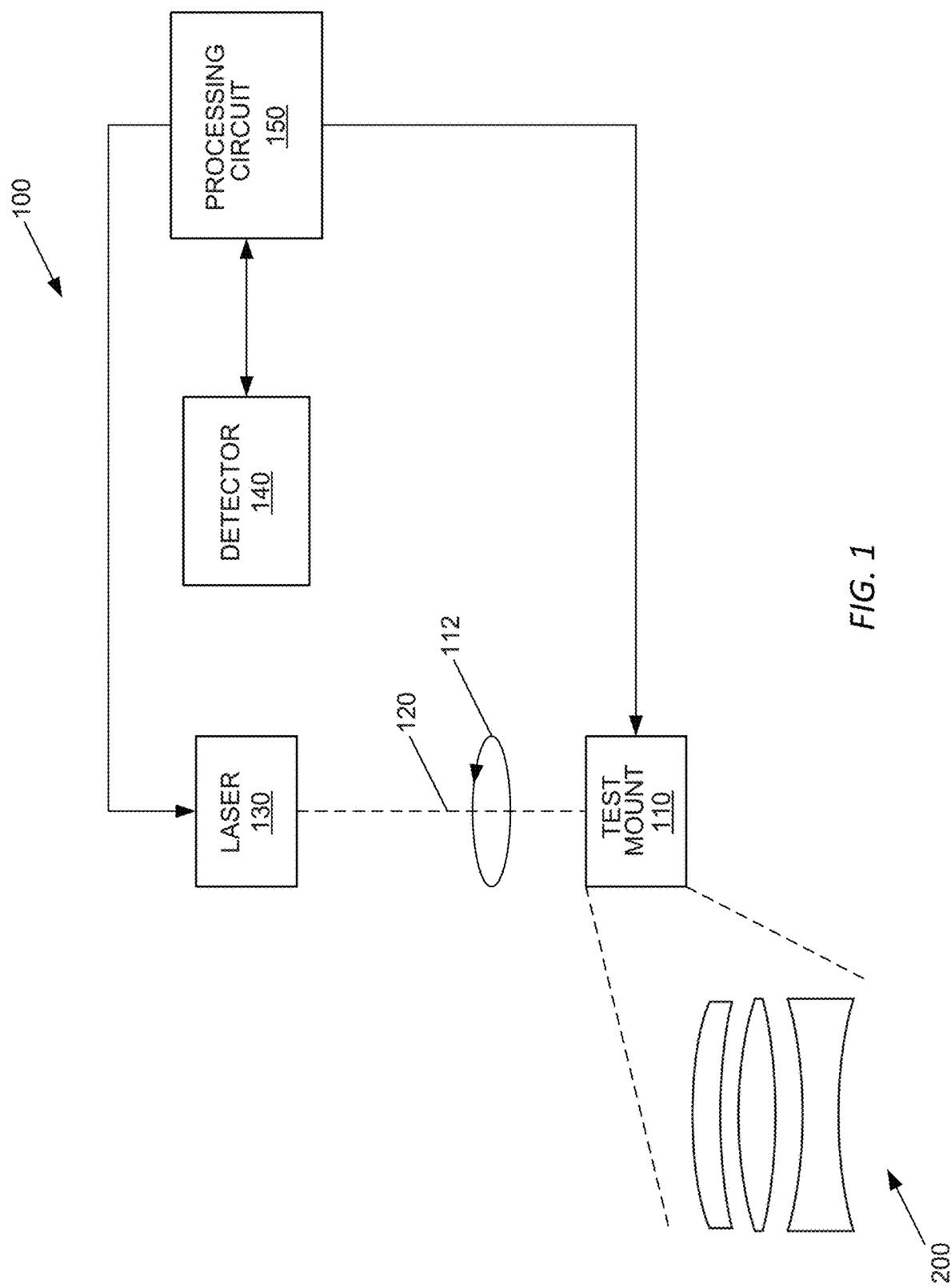
FIG. 1 shows a block diagram of an optical alignment system according to one exemplary embodiment.
Figure 3:
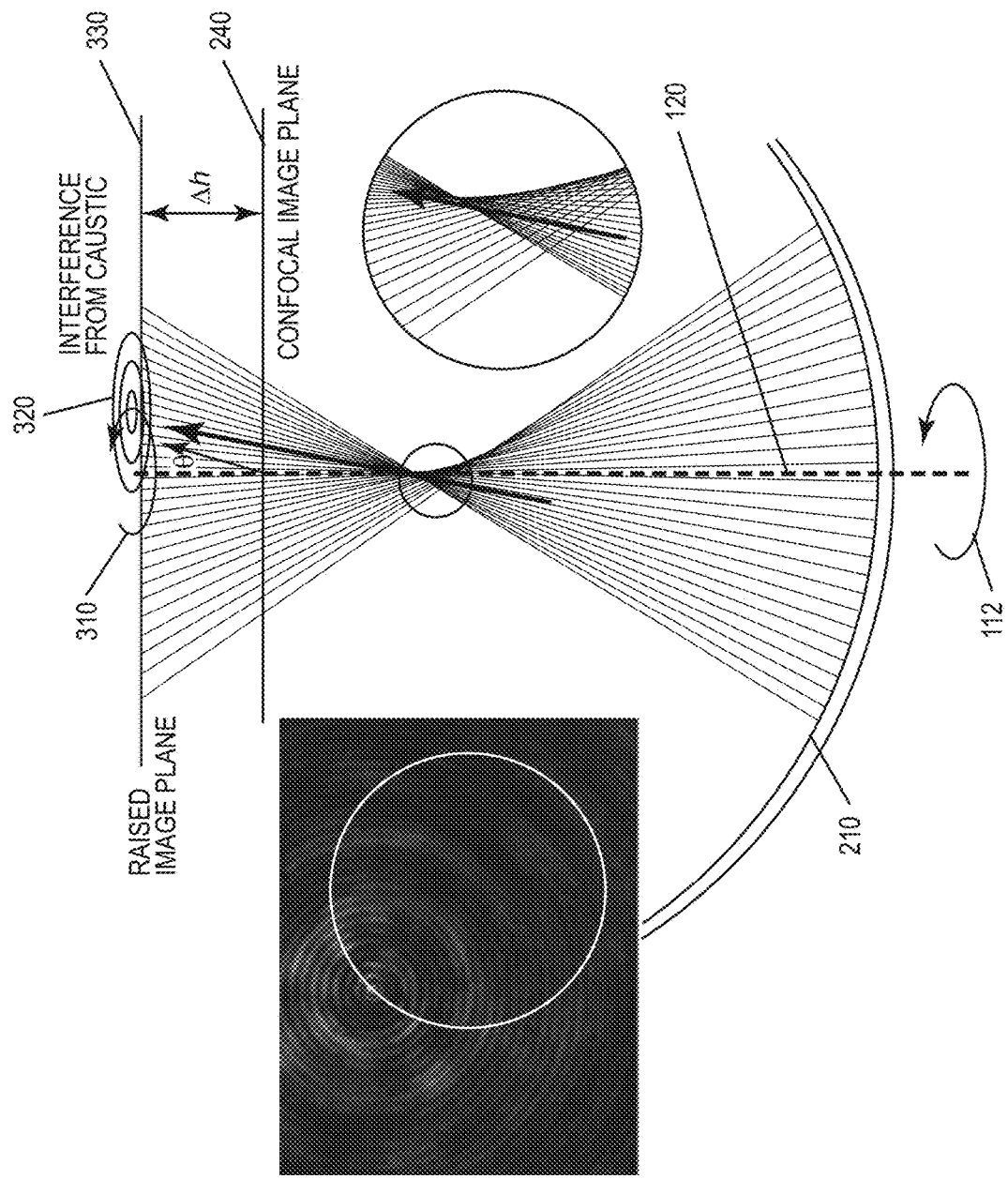
FIG. 3 shows tilt alignment according to exemplary embodiments of the solution presented herein.

FIG. 1 shows a block diagram of an optical alignment system 100 according to exemplary embodiments of the solution presented herein. The following describes the optical alignment system 100 of FIG. 1, with further reference to FIGS. 3 and 4. Optical alignment system 100 comprises a test mount 110, laser 130, detector 140, and processing circuit 150. The test mount 110 is centered on an axis 120, and is configured to rotate 112 about the axis 120. While the figures show a counter-clockwise rotation of the test mount 110, it will be appreciated that clockwise rotation may alternatively be used. Laser 130 directs laser light along the axis 120 to illuminate a test surface 210 of an optical assembly 200 disposed in the test mount 110. Detector 140 is configured to detect a tilt orbit 310 of an interference pattern 320 produced in a first image plane 330, also referred to herein as a tilt image plane 330, when the test mount 110 rotates about the axis 120. The interference pattern 320 is produced by interference resulting from the illumination of edges of the test surface 210 by the laser light. The tilt image plane 330 is perpendicular to the axis 120, and is spaced from a second image plane 240 by a difference Δh. The second image plane 240 represents a focus plane for paraxial rays of the laser light reflected by the test surface 210 that are used to determine centration errors of the surface 210, and thus is also referred to herein as a centration image plane 240. Processing circuit 150 is operatively connected to the detector 140 and is configured to determine a tilt error θ of the test surface 210 from the detected tilt orbit 310 and the difference Δh.

Figure 4:
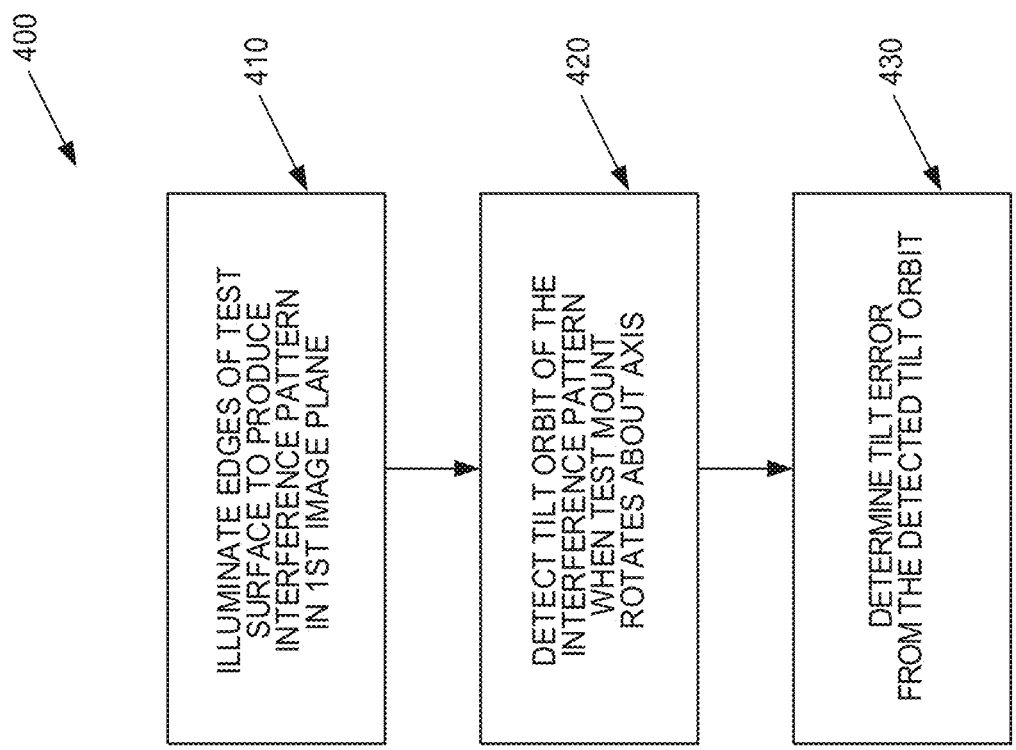
FIG. 4 shows an alignment method according to exemplary embodiments of the solution presented herein.

FIG. 4 shows a method 400 for measuring lens alignment errors according to exemplary embodiments of the solution presented herein. Method 400 comprises illuminating (block 410) edges of a test surface 210 of an optical assembly 200 disposed in a test mount 110 centered on an axis 120 with laser light emitted by a laser 130 along the axis 120 to produce an interference pattern 320 in a first image plane 330, also referred to herein as a tilt image plane 330. The tilt image plane 330 is perpendicular to the axis 120 and is spaced from a second image plane 240, also referred to herein as a centration image plane 240, by a difference Δh. The method 400 further comprises detecting (block 420) a tilt orbit 310 of the interference pattern 320 produced in the tilt image plane 330 when the test mount 110 rotates about the axis 120. The method 400 further comprises determining (block 430) a tilt error θ of the test surface 210 from the detected tilt orbit 310 and the difference Δh.

The following describes the solution presented herein in further detail with respect to the Opto Alignment LAS, which optically probes the aspheric edge with laser light produced by the LAS using an existing high-NA objective, and where return reflection from the surface edge is used to determine tilt in the aspheric axis using geometric principles. First, however, the following reviews active alignment methodology, and subsequently explains how the unique features of the LAS enable aspheric tilt measurement within the active alignment context, as well as presents experimental results supporting the feasibility and accuracy of the proposed tilt measurement technique. While the following describes the solution presented herein in terms of the LAS, it will be appreciated that the solution presented herein applies to any optical alignment system that uses a laser to illuminate an optical surface, that operates according to the method of FIG. 4, and that is capable of measuring centration errors using either a cats-eye or confocal focus plane.

Figure 2:
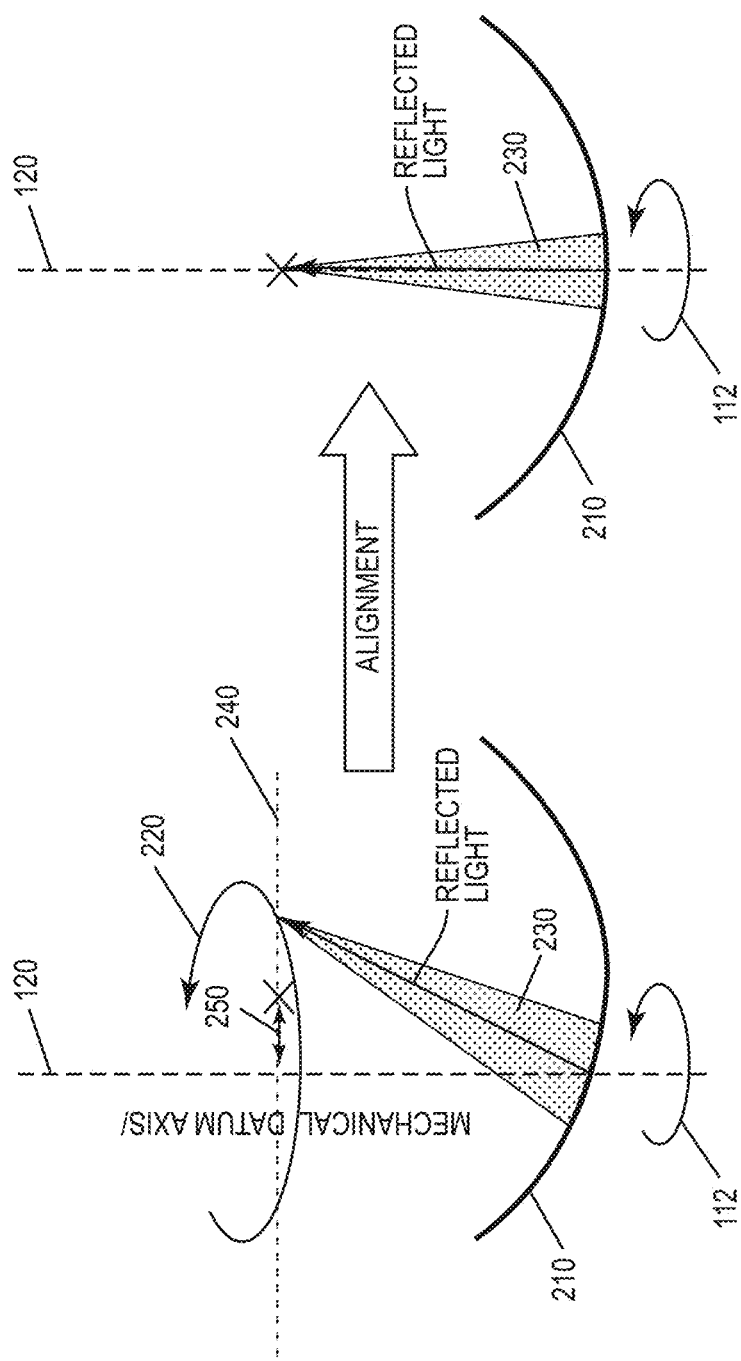
FIGS. 2A-2B show exemplary centration alignment.

FIGS. 2A-2B show an example of reflection-based active alignment used to find centration errors of an optical surface. Active alignment is a method for aligning optical assemblies which relies on an optical return to provide feedback for best positioning of the component lenses. While both reflection and transmission modes exist, the more effective feedback signal for centration is reflection. In reflection-based active alignment, the optical assembly housing is disposed in the test mount 110, which is aligned such that the axis 120 is collinear with the spindle axis of a precision air bearing of the test mount 110, which is configured to rotate the test mount 110 about the axis 120. Laser light emitted from the laser 130 from above the optical assembly is focused by and reflects off the test surface 210. When the test surface 210 is misaligned relative to the axis 120, e.g., the center of curvature (CC) of the surface 210 is off-axis, the focused light reflects at an angle. When the air-bearing rotates about the axis 120, the reflected light 230 also rotates, tracing an orbit 220 in the centration image plane 240 that is imaged onto a CCD camera, e.g., detector 140. The radius of the orbit 220 is directly proportional to the CC centration error, which can be quantitatively determined through ray tracing and geometric principles. The goal of alignment is to minimize this centration orbit 220, driving the CC to the axis 120, and thus, aligning the surface 210 by centering the surface 210 on the axis 120, as shown in FIG. 2B.

For complete centration and tilt information of a lens, reflections from top and bottom surfaces are used to determine the locations of the top and bottom CCs, respectively. The two CCs determine the optical axis of the lens, and thus, active alignment provides both lens position and orientation within the optical assembly 200. Because the measurements only rely on the CC positions, however active alignment tools are designed such that light propagates paraxially through the optical assembly 200, simplifying the ray trace and corresponding calculations.

Figure 5A:
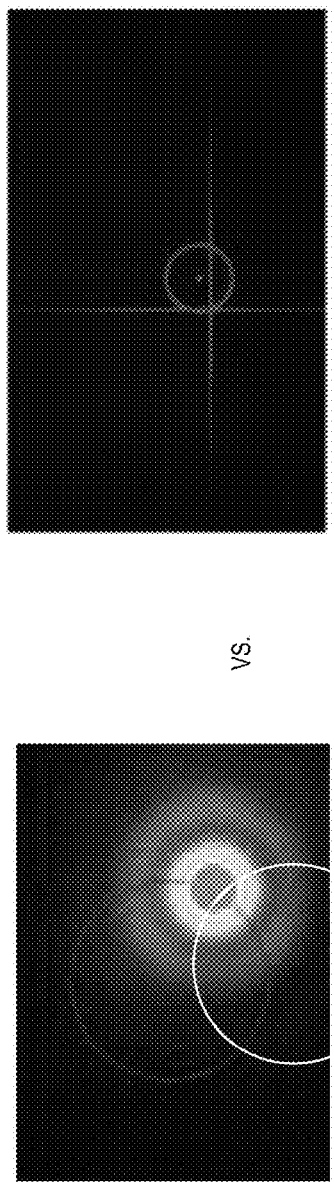
FIGS. 5A-5B compare LAS with auto-collimation.
Figure 5B:
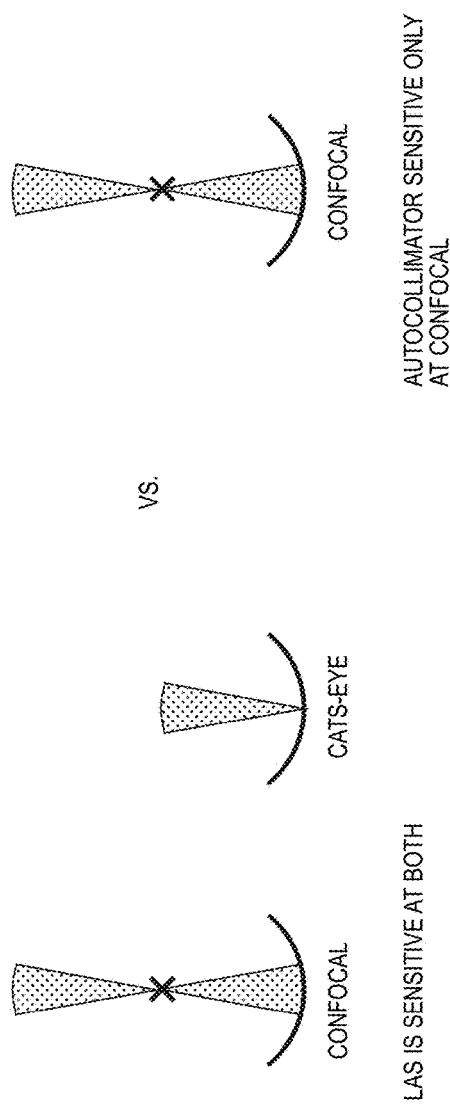

The above describes centration in terms of a laser-based active alignment system. One example of such a laser-based active alignment system is the LAS, which differs from an autocollimator in two unique ways: (1) the laser light source of the LAS and (2) the LAS optical design. FIGS. 5A-5B demonstrate these differences by comparing the results from an LAS with the results from an autocollimator.

The light source of the LAS is focused laser light in contrast to an illuminated reticle of the autocollimator (FIG. 5A). Using focused laser light not only enables precision height determination of the reflected focus with micron-level repeatability, but also offers expendable power, allowing the LAS to probe many more surfaces of an optical assembly than is possible with an illuminated reticle. Moreover, the quality of the focused laser spot enables more flexibility in measuring more challenging surfaces, such as cylindrical and aspherical surfaces, where a reticle image may become distorted.

A laser-based active alignment system is also unique in that its optical design permits sensitivity at both confocal and cat's eye image planes for an optical surface (FIG. 5B), while an autocollimator only has sensitivity at the confocal image plane. With the added sensitivity, the laser-based active alignment system has greater flexibility in lens measurement. For example, where confocal reflections may be inaccessible due to large radii of curvatures, or where confocal reflections may be too close in height to differentiate the reflecting surface, the cat's eye reflection provides an alternative measurement point without changing objectives, which simplifies and streamlines the active alignment process.

Accuracy in aspheric tilt measurements is dependent on the ability to determine the aspheric axis of the surface. In order to accomplish that, the system must be able to probe the surface's aspheric edge or edges. Conventional solutions achieve this using a specially designed module that is external to the active alignment system. The solution presented herein, however, involves direct measurement of the relative tilt of the aspheric edges with respect to the surface vertex the same components used for centration. For example, the laser light source of the LAS is used to optically probe the aspheric edges using a standard high-NA objective currently available with the LAS and image beyond the confocal (or cat's eye) image plane. With the available laser power, the LAS can flood the aspheric surface and detect reflected light (in the form of interference) from the aspherical edge or edges, as shown in FIGS. 6A-6B.

Figure 6B:
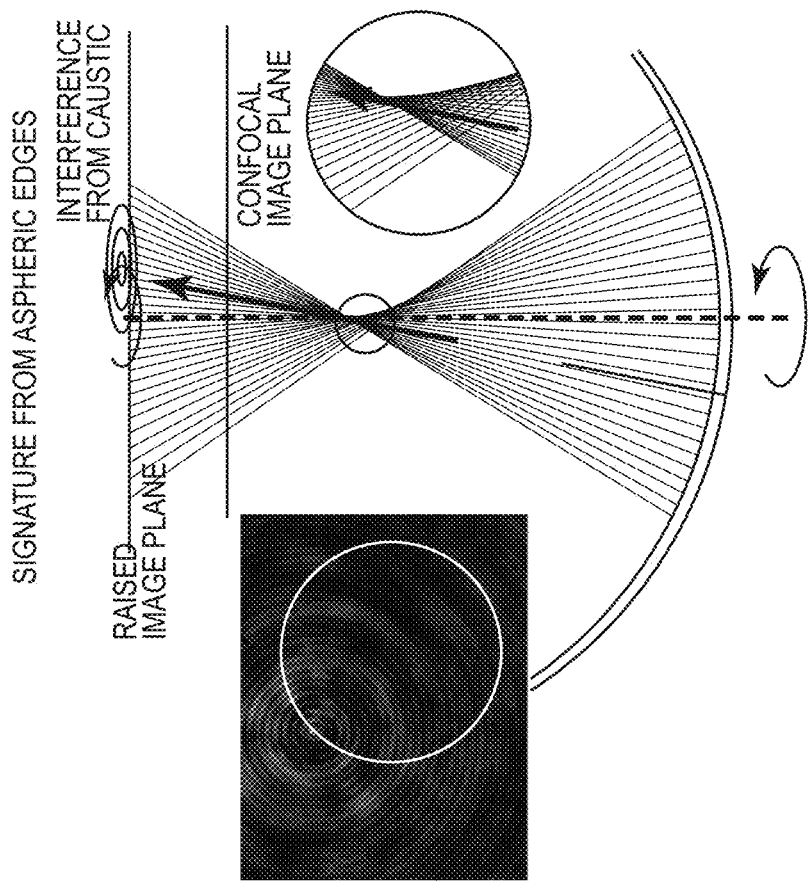
FIGS. 6A-6B show centration and tilt alignment according to exemplary embodiments of the solution presented herein.
Figure 6A:
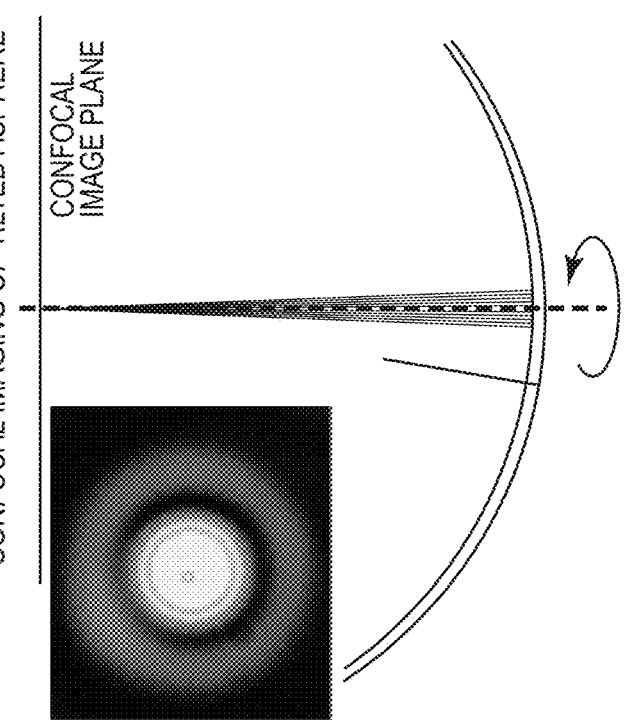

FIGS. 6A-6B compare traditional confocal focusing (FIG. 6A) with the flooding of the aspheric surface proposed herein (FIG. 6B). In FIG. 6A, the orange surface depicts the aspheric surface, while the black surface is a sphere of the paraxial radius of curvature. Both diagrams also depict the surface in the case where the paraxial CC is centered, but the edges exhibit large tilt. In the conventional confocal focusing (FIG. 6A), only the paraxial vertex is illuminated, leading to a focus with minimal orbit. The solution presented herein (FIG. 6B) illuminates the aspheric edge(s), leading to the interference pattern 320 that orbits the axis 120 as the test mount 110 rotates about the axis, where the center of this interference pattern is spaced from the axis 120 by a distance proportional to the tilt of the aspheric axis.

When tested, the illumination of the aspheric edges yields an optical signature comprised of interference-like concentric rings that exhibits an orbit when the aspheric axis is tilted and the surface rotates. From Zemax modeling, a possible source of the optical signature is interference of light propagating from the caustic focus of the aspheric surface.

Figure 7B:
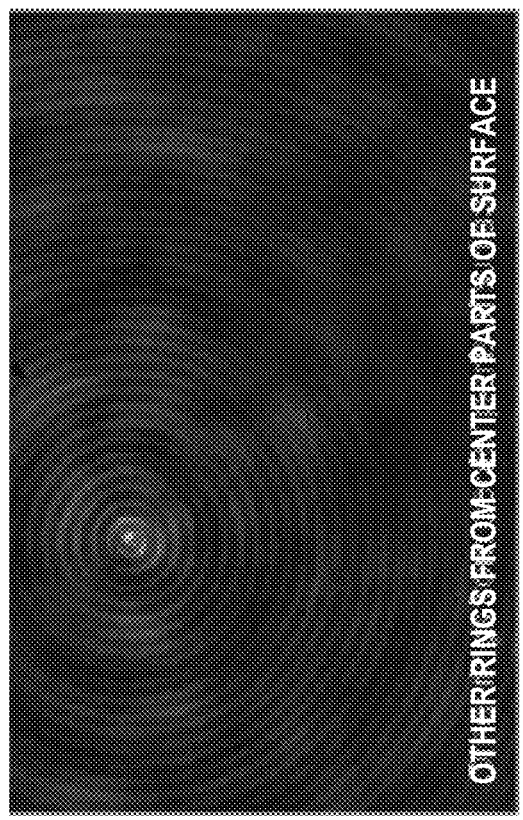
FIGS. 7A-7B demonstrate source of the interference pattern.
Figure 7A:
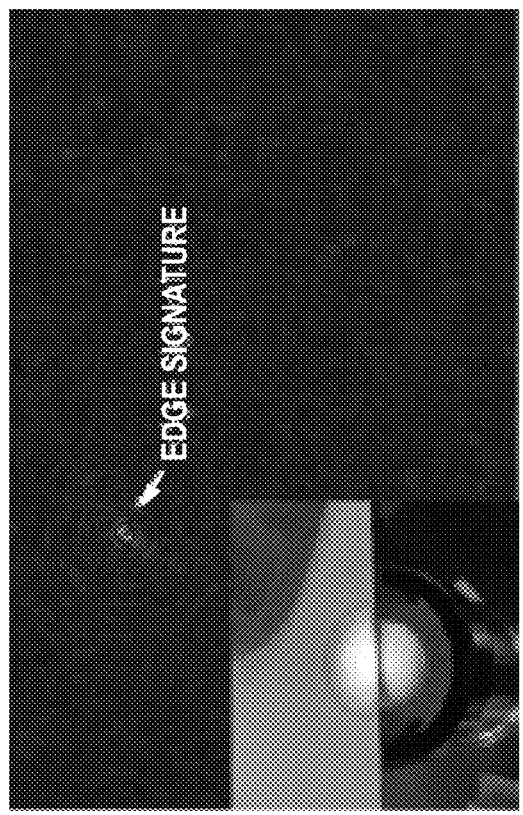

To verify that the aspheric edge is the source of the observed optical signature, a simple test was performed wherein the LAS was positioned to image the optical signature of an aspheric surface, and a plastic disk obscured the vertex during illumination. The image is compared with (FIG. 7A) and without (FIG. 7B) the obscuration. The image comparison clearly shows that even with the vertex obscured, the central core of the optical signature is still present. Therefore, it is reasonable to conclude that the reflected signal probes the aspheric edge(s), and that the reflected light from the vertex only adds to the peripheral ring structure.

The optical signature resulting from flooding the surface with laser light is seemingly ubiquitous across many varieties of aspheric. Whether CNC-milled or injection-molded, large or small base radius of curvature, concave or convex, even top or bottom surface, all optical surfaces imaged to date demonstrate this optical signature to some extent. As such, this optical signature provides valuable tilt information with respect to the test surface 210.

Figure 8:
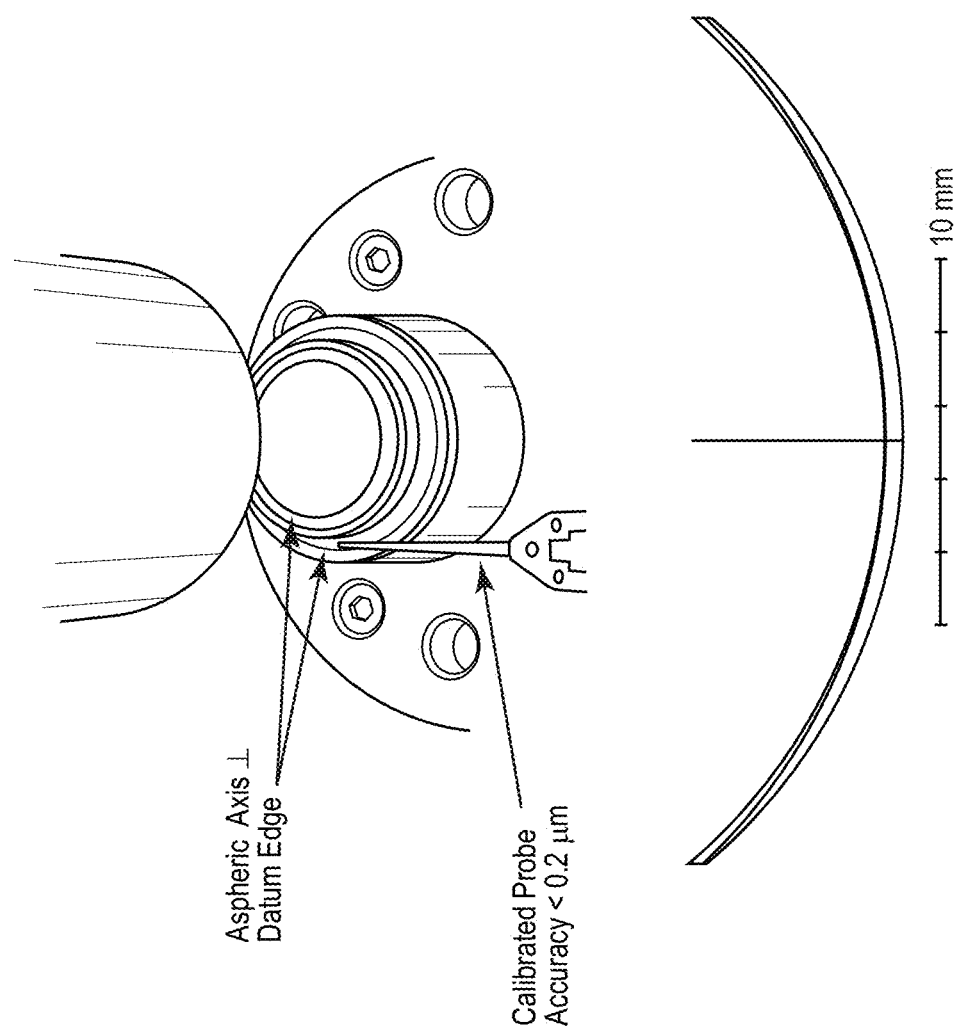
FIG. 8 shows an LAS according to exemplary embodiments of the solution presented herein.

In order to investigate the nature of the edge optical signature and to formulate the correlation between the signature orbit (of the interference pattern) and aspheric tilt, the concave aspheric surface of a CNC-milled aspheric lens was studied. For this experiment, the surface had a base radius of curvature of 15.887 mm, k=0, and 4th, 6th, 8th, and 10th order aspheric coefficients not equal to zero. Using the LAS, the surface was illuminated with a standard 30 mm working distance objective. The aspheric lens was mounted to a housing (e.g., the test mount 110), using the LAS to center the vertex. The aspheric lens had a flat datum edge perpendicular to the aspheric axis, and by minimizing the TIR read by a calibrated mechanical probe for both the datum edge of a housing and the datum edge of the aspheric lens, the aspheric axis was aligned parallel to the axis 120 of the housing. See FIG. 8, which shows a picture of a mounted aspheric lens under study (Top) and a diagram of aspheric surface showing departure from spherical surface of base radius of curvature (Bottom). The orange surface is aspheric, while the black surface is spherical with a base radius of curvature. The tip/tilt knobs of the precision air bearing were used to tilt the aspheric axis of the mounted aspheric lens, and through TIR on the housing datum edge, the aspheric tilt was measured for comparison to the signature orbit.

With this base setup, two experiments were conducted: height-dependence of orbit size for a fixed tilt, and tilt-dependence of orbit size for a fixed height. Through these two experiments, the feasibility of measuring tilt from the edge optical signature was demonstrated. When observing the edge signature, as much of the surface as possible was illuminated with the high-NA objective. For the concave surface under study, this meant the image plane was raised beyond the confocal focus plane. To determine how the relative height of the raised image plane impacted the signature orbit size, the tilt angle of the aspheric axis was fixed at three distinct angles and the orbit size was measured three times at several different heights above the confocal plane. For each fixed tilt, the paraxial CC was centered to <0.2 μm using the LAS at confocal. The average orbit size, P (FIG. 9), in pixels was plotted against the difference Δh between the tilt image plane and the centration image plane (e.g., the confocal image plane). The central core of the signature was enhanced to a solid spot using standard image processing available with LAS software for easier orbit detection (see insert images in FIG. 9A).

For each of the different tilts, all data demonstrated linear trends, and all trends shared the same intercept. These results indicate two important features of the optical signature. First, the slope of the data or the ratio between orbit radius and the Δh between the tilt image plane and the centration image plane is proportional to the aspheric tilt angle θ, i.e., $$\frac{P}{\Delta h} \propto 2\theta.$$

This linear trend suggests a relatively simple calculation for tilt from orbit size.

Secondly, the shared intercept indicates that the interference signature "grows" from the confocal focus, i.e., the interference signature is from imaging the propagation of the aspheric focus. This not only supports the idea that the signature tracks the caustic focus from the aspheric lens, but it also simplifies the calculation for tilt by defining the reference height of the image position to be the centration image plane, e.g., the confocal image plane.

To quantitatively determine the calculation to measure aspheric tilt from signature orbit size, the height of the image plane was fixed and the aspheric axis was systematically tilted about the vertex from 0" to 600", with the paraxial CC centered to <0.2 μm. Then the signature orbit was recorded three times at each tilt, and the average orbit was plotted against tilt as measured through the TIR from the mechanical probe (FIG. 10).

Figures 9A, 9B:
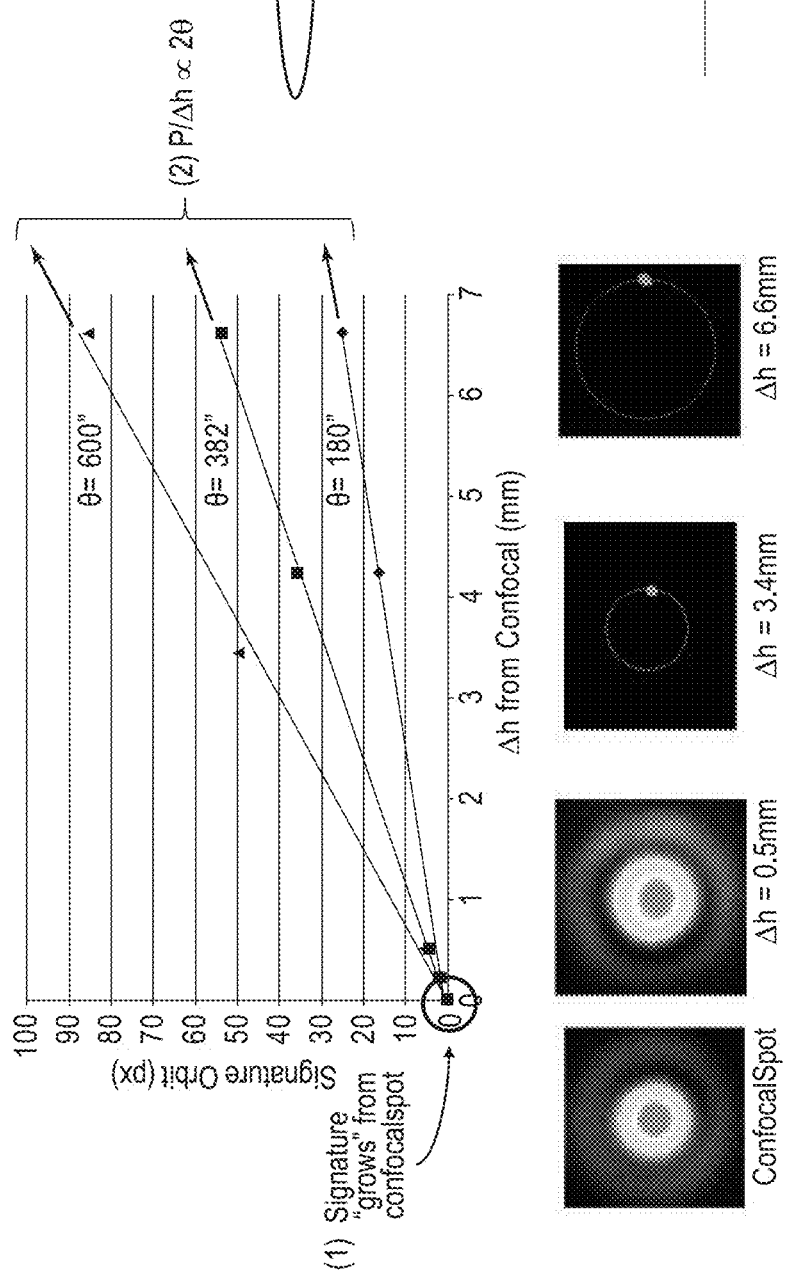
FIGS. 9A-9B tilt results according to exemplary embodiments of the solution presented herein.
Figure 10:
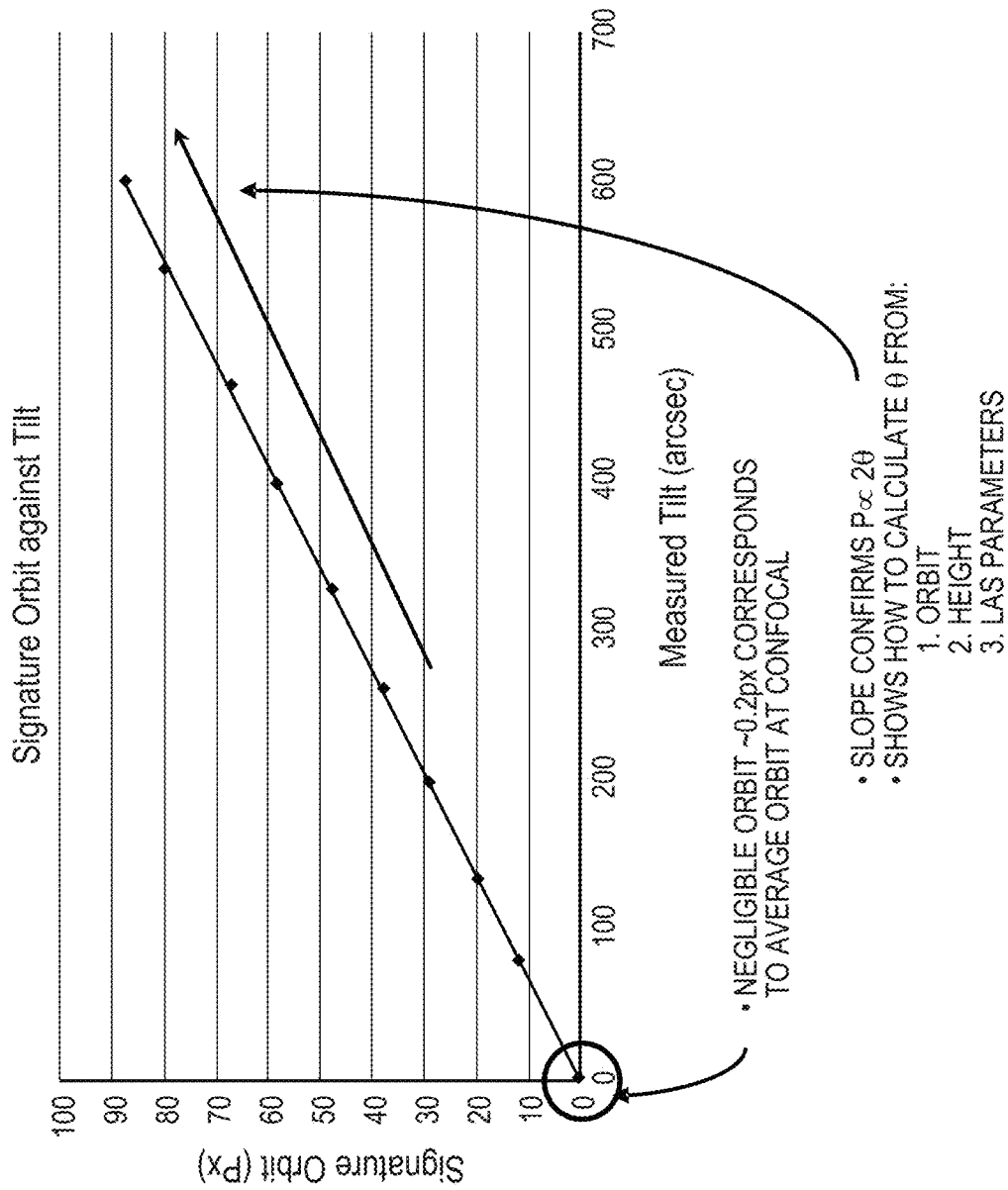
FIG. 10 shows additional tilt results according to exemplary embodiments of the solution presented herein.

The data in FIG. 10 demonstrates a linear relationship between orbit size and the measured tilt. This not only confirmed the results from the height dependence experiment, but the value of the slope gave the information needed to determine the exact relationship between orbit size and aspheric tilt. That relationship depends on three parameters: the orbit size of the optical signature, the difference between the tilt image plane and the centration image plane, and the LAS system parameters (e.g., magnification), etc. More particularly, the data in FIG. 10 also shows the final relationship has the direct proportion:

$$\frac{P}{\Delta h} \propto 2\theta,$$

from which a simple geometric relation can be crafted as a model behind the formula defining aspheric tilt from the signature orbit size (FIG. 9B). The proportionality constant depends on the system parameters, e.g., magnification γ determined via calibration. For example, for a top surface 210 of the optical assembly 200, the tilt angle θ may be calculated according to:

$$\theta = \frac{\gamma P}{2\Delta h}.$$

The intercept (e.g., 0.2 px) of the data is negligible; however, this intercept corresponds to the average residual orbit of the centered confocal spot, e.g., ~0.23 px. While these experiments center the confocal focus, this result suggests that the orbit of the confocal spot acts as an offset to the orbit of the optical signature.

Figure 11:
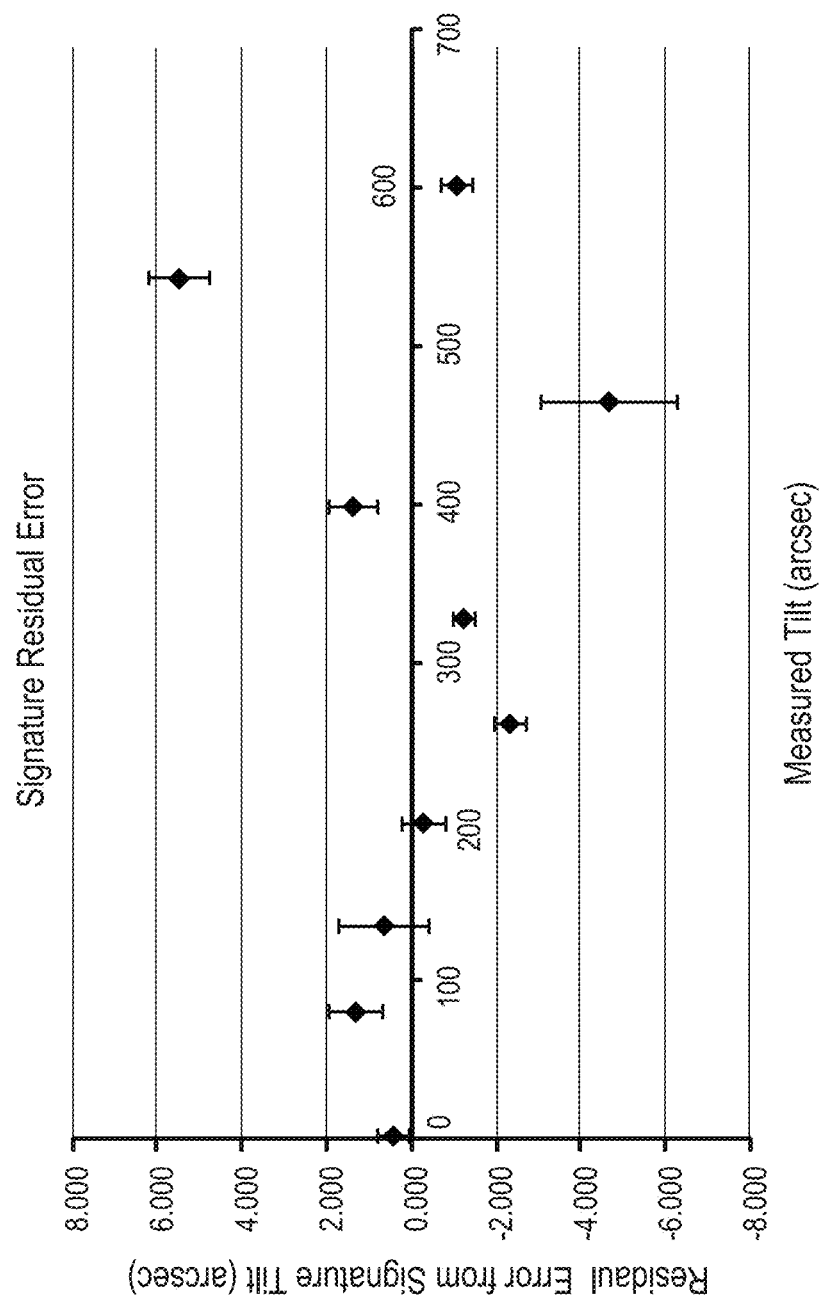
FIG. 11 shows error measurements according to exemplary embodiments of the solution presented herein.

By using the gathered orbit sizes and calculating aspheric tilt using the determined calculation, a data set of tilts with residual error from the probe measurement as depicted in FIG. 11 is obtained. It will be appreciated that while a tilt error may be determined from one value of P and one value of Δh, the accuracy of the tilt measurement improves when additional P and Δh measurements, e.g., as shown in FIG. 9A, are used.

These results successfully demonstrate how the solution presented herein determines the aspheric tilt using the orbit size of the edge optical (interference) signature to an accuracy of <8 arcsec, with an average absolute error of ~2 arcsec over 10 arcminutes of tilt. Thus, these results demonstrate how the solution presented herein provides an alternative method of accurately measuring the tilt of an aspheric surface by optically probing the aspheric edge with the existing technology of the LAS.

The solution presented herein generally applies to the top surface of an optical assembly, as well as to a bottom optical surface and any intervening optical surfaces. When measuring different surfaces of an optical assembly, it will be appreciated that the tilt and centration image planes associated with each surface may be at different locations, and that the spacing between the tilt and centration image planes may be the same or may be different for each surface of the optical assembly. In each case, however, the proportion holds.

The solution presented herein is described in terms of a tilt image plane (containing the optical signature, e.g., interference pattern) spaced from a centration image plane representing a focus plane for paraxial rays of the laser light reflected by the test surface. While the figures present this tilt image plane as being above the centration image plane (i.e., spaced farther from the optical test surface than the centration image plane), it will be appreciated that such is not required by the solution presented herein; in some embodiments, the tilt image plane may be below (i.e., spaced closer to the optical test surface than the centration image plane), e.g., when evaluating a convex lens surface.

It will be appreciated that the solution presented herein provides several advantages over conventional tilt measurement solutions. In particular, the solution presented herein uses the same light source, i.e., laser, and optical system for both tilt and centration measurements, and thus provides a lower cost, lower complexity solution. Further, by using a laser, the solution presented herein increases the accuracy of both the centration and tilt measurements, as well as facilitates intensity adjustment that may benefit the tilt measurement process. In addition, the use of the laser enables the solution presented herein to evaluate each of multiple surfaces of an optical assembly, instead of just the top/exposed surface.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended embodiments are intended to be embraced therein.

The invention claimed is:

1. An optical alignment system configured to measure alignment errors of one or more optical surfaces, the optical alignment system comprising:
    a test mount centered on an axis and configured to rotate about the axis;
    a laser configured to direct laser light along the axis to illuminate a test surface of an optical assembly disposed in the test mount;
    a detector configured to detect a tilt orbit of an interference pattern produced in a first image plane perpendicular to the axis when the test mount rotates about the axis, the interference pattern produced by interference resulting from the illumination of edges of the test surface by the laser light, said first image plane spaced from a second image plane by a difference Δh, the second image plane representing a focus plane for paraxial rays of the laser light reflected by the test surface; and
    a processing circuit operatively connected to the detector and configured to determine a tilt error θ of the test surface from the detected tilt orbit and the difference Δh.

2. The optical alignment system of claim 1 wherein:
    the detector is further configured to detect a centration orbit of a reflection of the test surface produced in the second image plane when the test mount rotates about the axis; and
    the processing circuit is further configured to determine a centration error of the test surface from the detected centration orbit.

3. The optical alignment system of claim 2 wherein the second image plane comprises a cats-eye image plane.

4. The optical alignment system of claim 2 wherein the second image plane comprises a confocal image plane.

5. The optical alignment system of claim 1 wherein:
    the detector is further configured to detect the tilt orbit of the interference pattern produced in each of a plurality of first image planes when the test mount rotates about the axis, each of the plurality of first image planes being perpendicular to the axis and being spaced from the second image plane by a different difference Δh; and
    the processing circuit determines the tilt error θ of the test surface from the plurality of detected tilt orbits and the corresponding differences Δh.

6. The optical alignment system of claim 1 wherein:
    the tilt orbit has a radius P representing a distance from the axis to a center of the interference pattern defining the tilt orbit; and
    the processing circuit is configured to determine the tilt error θ of the test surface from the radius P and the difference Δh.

7. The optical alignment system of claim 6 wherein the tilt error θ is proportional to the radius P and inversely proportional to the difference Δh.

8. The optical alignment system of claim 1 wherein:
    the optical assembly comprises a plurality of test surfaces associated with one or more lenses comprised in the optical assembly;
    the detector is configured to detect a tilt orbit of each interference pattern produced in a corresponding first image plane as the test mount rotates about the axis, each interference pattern produced by interference resulting from the illumination of edges of the corresponding test surface; and
    the processing circuit is configured to determine the tilt error θ of each test surface from the corresponding detected tilt orbit and the difference Δh.

9. The optical assembly of claim 8 wherein each detected tilt orbit is detected in a different first image plane associated with a corresponding different second image plane.

10. The optical alignment system of claim 9 wherein each first image plane has a different difference Δh relative to the corresponding second image plane.

11. The optical alignment system of claim 1 wherein the test surface comprises a surface of an aspheric element.

12. A method of measuring lens alignment errors, the method comprising:
    illuminating edges of a test surface of an optical assembly disposed in a test mount with laser light emitted along an axis to produce an interference pattern in a first image plane perpendicular to the axis, said test mount centered on the axis, said first image plane spaced from a second image plane by a difference $\Delta h$, the second image plane representing a focus plane for paraxial rays of the laser light reflected by the test surface;

detecting a tilt orbit of the interference pattern produced in the first image plane when the test mount rotates about the axis; and determining a tilt error $\theta$ of the test surface from the detected tilt orbit and the difference $\Delta h$.

13. The method of claim 12 further comprising:

illuminating the test surface with the laser light to produce a reflection of the test surface in the second image plane;

detecting a centration orbit of the reflection produced in the second image plane when the test mount rotates about the axis; and determining a centration error of the test surface from the detected centration orbit.

14. The method of claim 13 wherein the second image plane comprises a cats-eye image plane.

15. The method of claim 13 wherein the second image plane comprises a confocal image plane.

16. The method of claim 12 wherein:

said detecting the tilt orbit of the interference pattern comprises detecting the tilt orbit of the interference pattern produced in each of the plurality of the first image planes when the test mount rotates about the axis, each of the plurality of first image planes being perpendicular to the axis and being spaced from the second image plane by a different difference $\Delta h$; and said determining the tilt error $\theta$ comprises determining the tilt error $\theta$ of the test surface from the plurality of detected tilt orbits and the corresponding differences $\Delta h$.

17. The method of claim 12 wherein:

the tilt orbit has a radius P representing a distance from the axis to a center of the interference pattern defining the tilt orbit; and said determining the tilt error $\theta$ comprises determining the tilt error of the test surface from the radius P and the difference $\Delta h$.

18. The method of claim 17 wherein the tilt error $\theta$ is proportional to the radius P and inversely proportional to $\Delta h$.

19. The method of claim 12 wherein:

the optical assembly comprises a plurality of test surfaces associated with one or more lenses;

said detecting the tilt orbit comprises detecting a tilt orbit of each interference pattern produced in a corresponding first image plane as the test mount rotates about the axis, each interference pattern produced by interference resulting from the illumination of edges of the corresponding test surface; and said determining the tilt error $\theta$ comprises determining a tilt error $\theta$ of each test surface from the corresponding detected tilt orbit and the difference $\Delta h$.

20. The method of claim 19 wherein said detecting each tilt orbit comprises detecting each tilt orbit in a different first image plane associated with a corresponding second image plane.

21. The method of claim 20 wherein each first image plane has a different difference $\Delta h$ relative to the corresponding second image plane.

22. The method of claim 12 wherein the test surface comprises a surface of an aspheric element.

\* \* \* \* \*